Feb. 19, 1929.

A. E. ELLIOT 1,702,253

MOLD

Filed May 26, 1927

Albert E. Elliot,
INVENTOR

BY
ATTORNEY

Patented Feb. 19, 1929.

1,702,253

UNITED STATES PATENT OFFICE.

ALBERT E. ELLIOT, OF ATLANTA, GEORGIA.

MOLD.

Application filed May 26, 1927. Serial No. 194,406.

My invention relates to improvements in molds particularly adapted for molding plastic materials into building tile or other molded shapes.

The primary object of the invention is to provide a device of the above-mentioned character which is simple and durable in construction, reliable and efficient in operation and which will economically produce molded shapes.

Other objects and advantages of the invention will be apparent during the course of the following description.

Figure 1:
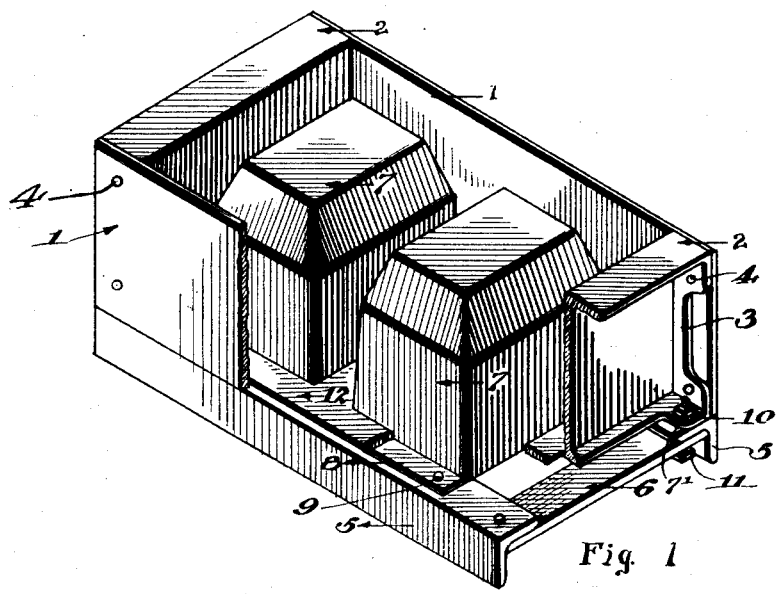
Figure 2:
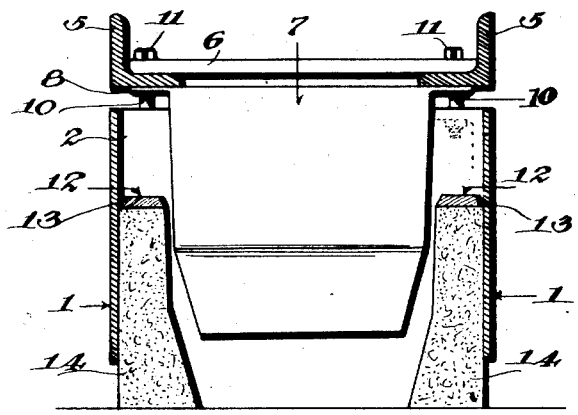

In the accompanying drawing, forming a part of this specification and in which like numerals are employed to designate like parts throughout the same, Fig. 1, is a perspective view of my improved mold with parts broken away, and, Fig. 2, is a vertical cross sectional view of the same.

In the drawing, wherein for the purpose of illustration, I have shown a preferred embodiment of my invention the mold box consists of side members 1 and end members 2, the latter having side flanges 3 to which the side members are securely connected by means of rivets 4.

The core rack is of skeleton structure composed of side angle bars 5, connected at their ends by cross bars 6, welded or otherwise securely fastened thereto. The tapered core members 7 are securely mounted on the angle bars 5 by flanges 8, fastened to the bars by bolts 9. The core rack is loosely connected at each corner to the mold box by lift bolts 10, as more clearly shown in Fig. 2. These bolts are provided with adjustable nuts 11, for adjusting the clearance between the core rack and mold box, when the former is lifted therefrom. A bottom member 12 is provided with openings to receive the core members and rests on the core rack having its under edges beveled as at 13. When the mold is inverted, as in Fig. 2, and the core members lifted the bottom member 12 rests on the molded shape 14.

In operation after the mold is filled with the plastic material and inverted on a firm surface, the core rack is lifted the length of the play in lift bolts 10, removing the core members. This relieves the mold box from the pressure of the molded material 14 caused by tamping and the mold box can then be withdrawn from the molded material. The bottom member 12, being loose remains seated on the upper edge of the molded material, preventing the edges or corners from being chipped.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A device of the character described comprising a mold box, a core rack supporting said box and lift bolts loosely connecting said box and core rack together.

2. A device of the character described comprising a mold box, a core rack supporting said box having core members mounted thereon, bolts loosely connecting said core rack with said box, and a bottom plate superimposed on said core rack.

3. A device of the character described comprising a core rack having spaced core members mounted thereon, a mold box disposed on said core rack, and bolts adjustably connecting said core rack with said box to provide play between the core rack and box.

4. A device of the character described comprising a core rack having spaced core members mounted thereon, a mold box loosely connected with said core rack and a bottom plate superimposed on said core rack for free movement in said box.

5. A device of the character described comprising a core rack having spaced core members mounted thereon, a mold box loosely connected with said core rack and a bottom plate superimposed on said core rack for free movement in said box, said plate having its edges beveled.

6. A device of the character described comprising a core rack, and an invertible mold box loosely connected with said core rack, whereby the core rack may be moved vertically with respect to the mold box upon inverting the mold.

7. A device of the character described comprising a core rack, an invertible mold box disposed on said core rack, and means loosely connecting said box and core rack together, whereby the core rack may be moved vertically with respect to the mold box upon inverting the mold.

8. A device of the character described comprising a core rack, an invertible mold box and means loosely connecting said box to said core rack, whereby the core rack may be moved vertically with respect to the mold box upon inverting the mold.

9. A device of the character described comprising a core rack, a mold box and adjustable means loosely connecting said box to said core rack.

10. A device of the character described comprising a core rack, a mold box loosely connected with said core rack adapted to be inverted to permit vertical movement of the core rack with respect to the mold box and a bottom plate superimposed on said core rack.

11. A device of the character described comprising a core rack, a mold box loosely connected with said core rack adapted to be inverted to permit vertical movement of the core rack with respect to the mold box, and means for limiting the movement of said core rack.

In testimony whereof I affix my signature.

ALBERT E. ELLIOT.